United States Patent
Maejima et al.

(10) Patent No.: US 11,805,294 B2
(45) Date of Patent: Oct. 31, 2023

(54) CONTENT PLAYBACK DEVICE, CONTENT PLAYBACK METHOD AND CONTENT PLAYBACK PROGRAM

(71) Applicant: NIPPON TELEGRAPH AND TELEPHONE CORPORATION, Tokyo (JP)

(72) Inventors: Sotaro Maejima, Musashino (JP); Yasuhiro Mochida, Musashino (JP); Takahiro Yamaguchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 96 days.

(21) Appl. No.: 17/625,368

(22) PCT Filed: Jul. 10, 2019

(86) PCT No.: PCT/JP2019/027389
§ 371 (c)(1),
(2) Date: Jan. 7, 2022

(87) PCT Pub. No.: WO2021/005757
PCT Pub. Date: Jan. 14, 2021

(65) Prior Publication Data
US 2022/0256240 A1    Aug. 11, 2022

(51) Int. Cl.
*H04N 21/4402* (2011.01)
*H04N 21/435* (2011.01)
*H04N 21/84* (2011.01)

(52) U.S. Cl.
CPC . *H04N 21/440218* (2013.01); *H04N 21/4358* (2013.01); *H04N 21/84* (2013.01)

(58) Field of Classification Search
CPC ....... H04N 21/440218; H04N 21/4358; H04N 21/84; H04N 21/43615; H04N 21/4363
See application file for complete search history.

(56) References Cited

U.S. PATENT DOCUMENTS

| | | | |
|---|---|---|---|
| 7,844,169 B2 * | 11/2010 | Lee | H04N 19/40 386/353 |
| 2010/0223407 A1 * | 9/2010 | Dong | H04N 21/2402 710/70 |

(Continued)

FOREIGN PATENT DOCUMENTS

| | | | | |
|---|---|---|---|---|
| JP | 6773190 B2 * | 10/2020 | | G06K 9/00684 |
| WO | WO-2012111339 A1 * | 8/2012 | | H04N 21/4363 |
| WO | WO-2016006745 A1 * | 1/2016 | | G06F 21/608 |

OTHER PUBLICATIONS

JP-6773190-B2 Machine Translation (Year: 2020).*

(Continued)

*Primary Examiner* — Fernando Alcon
(74) *Attorney, Agent, or Firm* — Harness, Dickey & Pierce, P.L.C.

(57) ABSTRACT

The present disclosure is intended to enable playback of media data corresponding to a sensibility effect set in advance. A content playback device (91) of the present disclosure includes: a device table production unit (10) holding a device table in which a format of media data that can be played back and a device parameter are determined for each device; a media table production unit (20) configured to acquire metadata including the format and a sensibility effect label of the media data, determine a mapping evaluation scale that is a device parameter corresponding to the sensibility effect label, and produce a media table in which the mapping evaluation scale and the format are determined for each media data; and a mapping determination unit (30) configured to extract, based on the formats, a combination pattern of a device on which media data can be played back and the media data, select, from among extracted combination patterns, a combination pattern for which a relative error between the device parameter and the (Continued)

PARAMETERS TRANSMITTED TO MAPPING DETERMINATION UNIT

| PLAYBACK DEVICE | SUPPORTED FORMAT | DEVICE PARAMETER |
|---|---|---|
| $D_1$ (IMAGE DISPLAY) | H.264 | FRAME RATE $d_{11}$=30<br>PROJECTION AREA $d_{12}$=2.0 |
| $D_2$ (IMAGE DISPLAY) | H.264, H.265 | FRAME RATE $d_{21}$=50<br>PROJECTION AREA $d_{22}$=1.0 |
| $D_3$ (ILLUMINATION INSTRUMENT) | 8bit HSV | FLUX $d_{31}$=1000<br>ILLUMINANCE ANGLE $d_{32}$=0.5 |
| $D_4$ (ILLUMINATION INSTRUMENT) | 8bit HSV | FLUX $d_{41}$=1300<br>ILLUMINANCE ANGLE $d_{42}$=0.75 | mapping evaluation scale is minimum, and select a device that is an output destination of the media data.

10 Claims, 13 Drawing Sheets

(56) References Cited

U.S. PATENT DOCUMENTS

| | | | | |
|---|---|---|---|---|
| 2011/0126104 | A1* | 5/2011 | Woods | H04N 21/482 |
| | | | | 725/86 |
| 2012/0151006 | A1* | 6/2012 | McInerney | H04L 12/2818 |
| | | | | 709/227 |
| 2012/0210378 | A1* | 8/2012 | McCoy | H04N 21/431 |
| | | | | 725/109 |
| 2013/0346564 | A1* | 12/2013 | Warrick | H04L 41/0816 |
| | | | | 709/219 |
| 2014/0038514 | A1* | 2/2014 | Robbins | H04N 21/440218 |
| | | | | 455/3.06 |
| 2015/0188975 | A1* | 7/2015 | Hansen | H04L 65/70 |
| | | | | 709/231 |
| 2016/0173937 | A1* | 6/2016 | Shih | H04N 21/4363 |
| | | | | 725/81 |
| 2017/0131863 | A1* | 5/2017 | Wheeler | G06F 3/0484 |
| 2017/0164065 | A1* | 6/2017 | Aggarwal | H04N 21/84 |
| 2017/0272819 | A1* | 9/2017 | Zerr | H04N 21/4753 |
| 2018/0139512 | A1* | 5/2018 | Moran | H04N 21/41265 |
| 2018/0146378 | A1* | 5/2018 | Christmas | H04N 21/43637 |
| 2020/0169782 | A1* | 5/2020 | Ribeiro De Oliveira | |
| | | | | H04N 21/242 |
| 2022/0321420 | A1* | 10/2022 | Sathya | H04N 21/4788 |

OTHER PUBLICATIONS

Andreas Fender et al., "OptiSpace: Automated Placement of Interactive 3D Projection Mapping Content", CHI 2018, Apr. 21, 2018.
Sotaro Maejima et al., "A Proposal of Automatic Media Presentation Architecture", 2019 IEICE General Conference, Mar. 19, 2019.

* cited by examiner

Fig. 3

SPECIFIC EXAMPLE OF DEVICE INFORMATION

| PLAYBACK DEVICE | SUPPORTED FORMAT | DEVICE PARAMETER | NETWORK PARAMETER |
|---|---|---|---|
| $D_1$ (IMAGE DISPLAY) | H.264 | FRAME RATE $d_{11}=30$ PROJECTION AREA $d_{12}=2.0$ | IP ADDRESS=192.168.1.10 PORT NUMBER=8118 SUPPORTED PROTOCOL=RTP |

Fig. 4

DEVICE TABLE AFTER UPDATE

| PLAYBACK DEVICE | SUPPORTED FORMAT | DEVICE PARAMETER | NETWORK PARAMETER |
|---|---|---|---|
| $D_1$ (IMAGE DISPLAY) | H.264 | FRAME RATE $d_{11}=30$ PROJECTION AREA $d_{12}=2.0$ | IP ADDRESS=192.168.1.10 PORT NUMBER=8118 SUPPORTED PROTOCOL=RTP |
| $D_2$ (IMAGE DISPLAY) | H.264,H.265 | FRAME RATE $d_{21}=50$ PROJECTION AREA $d_{22}=1.0$ | IP ADDRESS=192.168.1.11 PORT NUMBER=8118 SUPPORTED PROTOCOL=RTP |
| $D_3$ (ILLUMINATION INSTRUMENT) | 8bit HSV | FLUX $d_{31}=1000$ ILLUMINANCE ANGLE $d_{32}=0.5$ | IP ADDRESS=192.168.1.12 PORT NUMBER=8118 SUPPORTED PROTOCOL=HTTP |
| $D_4$ (ILLUMINATION INSTRUMENT) | 8bit HSV | FLUX $d_{41}=1300$ ILLUMINANCE ANGLE $d_{42}=0.75$ | IP ADDRESS=192.168.1.13 PORT NUMBER=8118 SUPPORTED PROTOCOL=HTTP |

Fig. 5

PARAMETERS TRANSMITTED TO MAPPING DETERMINATION UNIT

| PLAYBACK DEVICE | SUPPORTED FORMAT | DEVICE PARAMETER |
|---|---|---|
| $D_1$ (IMAGE DISPLAY) | H.264 | FRAME RATE $d_{11}=30$ PROJECTION AREA $d_{12}=2.0$ |
| $D_2$ (IMAGE DISPLAY) | H.264,H.265 | FRAME RATE $d_{21}=50$ PROJECTION AREA $d_{22}=1.0$ |
| $D_3$ (ILLUMINATION INSTRUMENT) | 8bit HSV | FLUX $d_{31}=1000$ ILLUMINANCE ANGLE $d_{32}=0.5$ |
| $D_4$ (ILLUMINATION INSTRUMENT) | 8bit HSV | FLUX $d4_1=1300$ ILLUMINANCE ANGLE $d_{42}=0.75$ |

Fig. 6

PARAMETERS TRANSMITTED TO OUTPUT UNIT

| PLAYBACK DEVICE | NETWORK PARAMETER |
|---|---|
| $D_1$ (IMAGE DISPLAY) | IP ADDRESS=192.168.1.10<br>PORT NUMBER=8118<br>SUPPORTED PROTOCOL=RTP |
| $D_2$ (IMAGE DISPLAY) | IP ADDRESS=192.168.1.11<br>PORT NUMBER=8118<br>SUPPORTED PROTOCOL=RTP |
| $D_3$ (ILLUMINATION INSTRUMENT) | IP ADDRESS=192.168.1.12<br>PORT NUMBER=8118<br>SUPPORTED PROTOCOL=HTTP |
| $D_4$ (ILLUMINATION INSTRUMENT) | IP ADDRESS=192.168.1.13<br>PORT NUMBER=8118<br>SUPPORTED PROTOCOL=HTTP |

Fig. 7

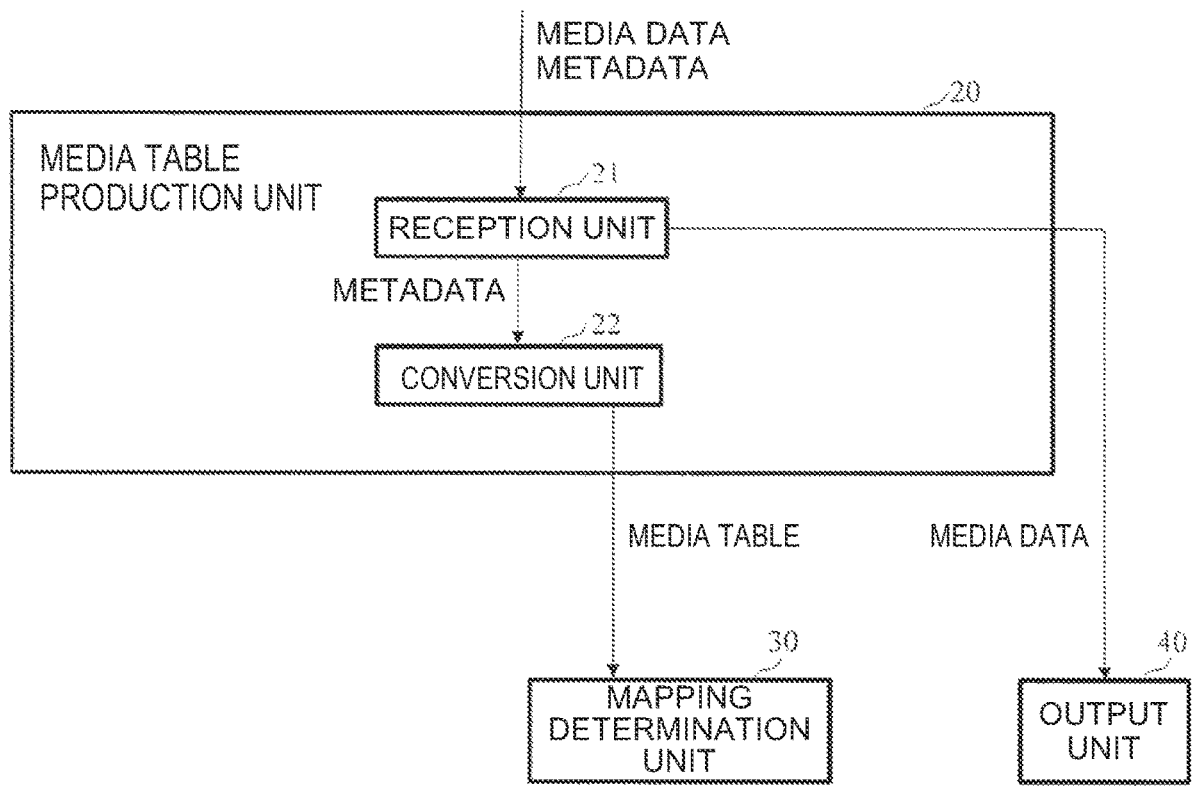

Fig. 8

METADATA

| MEDIA | FORMAT | SENSIBILITY EFFECT LABEL |
|---|---|---|
| $M_1$ (IMAGE) | H.264 | ACTION EFFECT |
| $M_2$ (ILLUMINATION) | 8bit HSV | |

Fig. 9

CONVERSION TABLE OF SENSIBILITY EFFECT LABEL AND MAPPING EVALUATION SCALE

| SENSIBILITY EFFECT LABEL | FORMAT | MAPPING EVALUATION SCALE |
|---|---|---|
| ACTION EFFECT | H.264, H.265 | · PROJECTION AREA=1.8 (WEIGHT 1.0), FRAME RATE=60 (WEIGHT 0.5)<br>· OVERALL WEIGHT=0.7 |
| | 8bitRGB, 8bitHSV | · ILLUMINANCE ANGLE=1.0 (WEIGHT 1.0), FLUX=1800 (WEIGHT 0.3)<br>· OVERALL WEIGHT=0.3 |
| REALITY EFFECT | H.264, H.265 | · FRAME RATE=60 (WEIGHT 1.0), BIT DEPTH=16 (WEIGHT 0.5)<br>· OVERALL WEIGHT=0.6 |
| | 8bitRGB, 8bitHSV | · COLOR RENDERING PROPERTY(WEIGHT 1.0), BIT DEPTH=16 (WEIGHT 0.5)<br>· OVERALL WEIGHT=0.4 |

Fig. 10

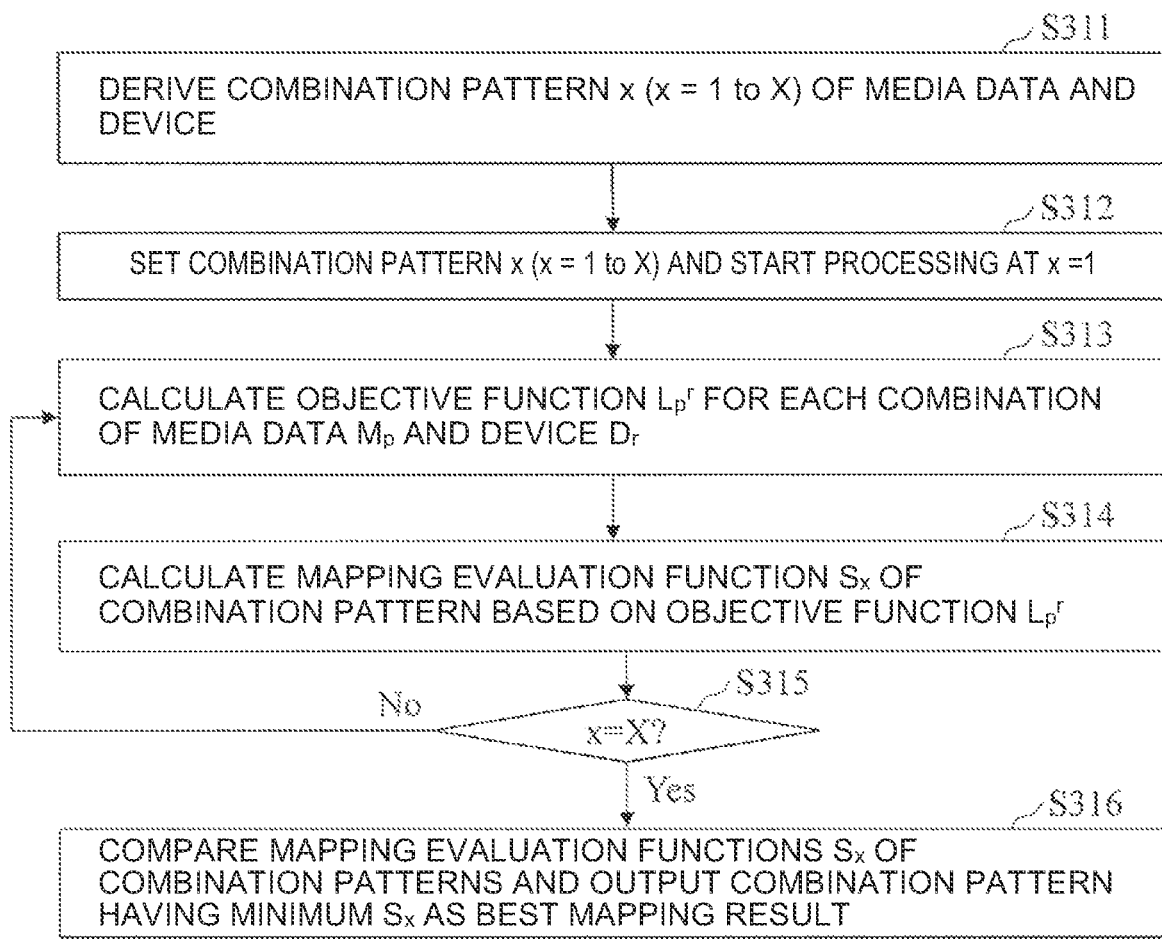

MEDIA TABLE

| MEDIA | FORMAT | MAPPING EVALUATION SCALE |
|---|---|---|
| $M_1$ (IMAGE) | H.264 | · PROJECTION AREA $E_{11}$=1.8 (WEIGHT $g_{11}$=1.0), FRAME RATE $E_{12}$=60 (WEIGHT $g_{12}$=0.5)<br>· OVERALL WEIGHT $G_1$=0.7 |
| $M_2$ (ILLUMINATION) | 8bit HSV | · ILLUMINANCE ANGLE $E_{21}$=1.0 (WEIGHT $g_{21}$=1.0), FLUX $E_{22}$=1800 (WEIGHT $g_{22}$=0.3)<br>· OVERALL WEIGHT $G_2$=0.3 |

Fig. 11

S311: DERIVE COMBINATION PATTERN x (x = 1 to X) OF MEDIA DATA AND DEVICE

S312: SET COMBINATION PATTERN x (x = 1 to X) AND START PROCESSING AT x =1

S313: CALCULATE OBJECTIVE FUNCTION $L_p{}^r$ FOR EACH COMBINATION OF MEDIA DATA $M_p$ AND DEVICE $D_r$

S314: CALCULATE MAPPING EVALUATION FUNCTION $S_x$ OF COMBINATION PATTERN BASED ON OBJECTIVE FUNCTION $L_p{}^r$

S315: x=X?  No → (back to S313)  Yes ↓

S316: COMPARE MAPPING EVALUATION FUNCTIONS $S_x$ OF COMBINATION PATTERNS AND OUTPUT COMBINATION PATTERN HAVING MINIMUM $S_x$ AS BEST MAPPING RESULT

Fig. 14

FORMAT CONVERSION TABLE

| BIDIRECTIONALLY CONVERTIBLE COMBINATION |
|---|
| H.265, Xvid, H.264 |
| 8bit HSV, 8bit RGB, 8bit CMY |

Fig. 15

FORMAT CONVERSION TABLE

| UNIDIRECTIONALLY CONVERTIBLE COMBINATION | |
|---|---|
| CONVERSION SOURCE | CONVERSION DESTINATION |
| RAW | H.264, H.265, Xvid |
| 16bit HSV | 8bit HSV, 8bit RGB, 8bit CMY |

Fig. 16

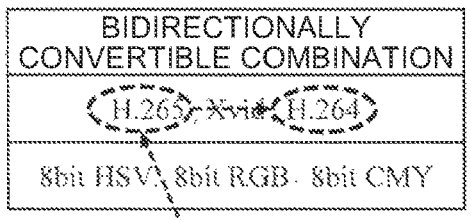

Fig. 17

DEVICE INFORMATION

| PLAYBACK DEVICE | SUPPORTED FORMAT | DEVICE PARAMETER | NETWORK PARAMETER |
|---|---|---|---|
| $D_1$ (IMAGE DISPLAY) | H.264 | FRAME RATE $d_{11}$=30<br>PROJECTION AREA $d_{12}$=2.0<br>BRIGHTNESS $d_{13}$=MINIMUM VALUE: 1.0, MAXIMUM VALUE 3.0, STEP 0.5 | IP ADDRESS=192.168.1.10<br>PORT NUMBER=8118<br>SUPPORTED PROTOCOL=RTP |

Fig. 18

MEDIA TABLE

| MEDIA | FORMAT | MAPPING EVALUATION SCALE |
|---|---|---|
| $M_1$ (IMAGE) | H.264 | · PROJECTION AREA $E_{11}$=1.8 (WEIGHT $g_{11}$=1.0),<br>FRAME RATE $E_{12}$=60 (WEIGHT $g_{12}$=0.5)<br>BRIGHTNESS $E_{13}$=2.2 (WEIGHT $g_{13}$=0.3)<br>· OVERALL WEIGHT $G_1$=0.7 |

Fig. 19

METADATA

| MEDIA | FORMAT | RELATION WITH OTHER MEDIA | SENSIBILITY EFFECT LABEL |
|---|---|---|---|
| $M_1$ (IMAGE) | H.264 | MAIN (TO $M_2$) | ACTION EFFECT |
| $M_2$ (IMAGE) | H.264 | SUB (TO $M_1$) | |

Fig. 20

CONVERSION TABLE OF SENSIBILITY EFFECT LABEL AND MAPPING EVALUATION SCALE

| SENSIBILITY EFFECT LABEL | MEDIA RELATION | FORMAT | MAPPING EVALUATION SCALE |
|---|---|---|---|
| ACTION EFFECT | MAIN | H.264, H.265 | · PROJECTION AREA=1.8 (WEIGHT 1.0), FRAME RATE=60 (WEIGHT 0.5) · OVERALL WEIGHT=0.7 |
| | SUB | | · PROJECTION AREA=1.8 (WEIGHT 1.0), RELATIVE DISTANCE TO MAIN MEDIA=2.0 (WEIGHT 0.5) FRAME RATE=60 (WEIGHT 0.3) · OVERALL WEIGHT=0.4 |

Fig. 21

MEDIA TABLE

| MEDIA | FORMAT | MAPPING EVALUATION SCALE |
|---|---|---|
| $M_1$ (IMAGE) | H.264 | · PROJECTION AREA $E_{11}$=1.8 (WEIGHT $g_{11}$=1.0), FRAME RATE $E_{12}$=60 (WEIGHT $g_{12}$=0.5) · OVERALL WEIGHT $G_1$=0.6 |
| $M_2$ (IMAGE) | H.264 | · PROJECTION AREA $E_{21}$=1.5 (WEIGHT $g_{21}$=1.0), RELATIVE DISTANCE TO $M_1$ $E_{22}$=2.0 (WEIGHT 0.5), FRAME RATE $E_{23}$=60 (WEIGHT $g_{22}$=0.3) · OVERALL WEIGHT $G_2$=0.3 |

Fig. 22

CALCULATION METHOD OF MAPPING EVALUATION SCALE

| MAPPING EVALUATION SCALE | CORRESPONDING DEVICE PARAMETER | CALCULATION METHOD OF OUTPUT VALUE OF MAPPING EVALUATION SCALE |
|---|---|---|
| RELATIVE DISTANCE BETWEEN MAIN MEDIA AND SUB MEDIA | THREE DIMENSIONAL COORDINATES OF A DEVICE FOR MAPPING MAIN MEDIA : $\vec{v}_a$<br>THREE DIMENSIONAL COORDINATES OF A DEVICE FOR MAPPING SUB MEDIA : $\vec{v}_b$ | $|\vec{v}_a - \vec{v}_b|$ |

Fig. 23

DEVICE TABLE

| PLAYBACK DEVICE | SUPPORTED FORMAT | DEVICE PARAMETER |
|---|---|---|
| $D_1$ (IMAGE DISPLAY) | H.264 | FRAME RATE $d_{11}=30$<br>PROJECTION AREA $d_{12}=2.0$<br>THREE-DIMENSIONAL COORDINATES $d_{13}=(0,1,2)$ |
| $D_2$ (IMAGE DISPLAY) | H.264 | FRAME RATE $d_{11}=30$<br>PROJECTION AREA $d_{12}=2.0$<br>THREE-DIMENSIONAL COORDINATES $d_{23}=(0,2,1)$ |

SPATIAL PARAMETER TABLE (SPECIFIC EXAMPLE)

| SPATIAL PARAMETER | PARAMETER DETAILS |
|---|---|
| 3D MAP | EQUATIONS FOR WALL SURFACES IN THREE-DIMENSIONAL SPACE<br>$W1: Z = 0 (X \leq a, Y \leq b)$<br>$W2: Y = 0 (X \leq a, Z \leq c)$<br>$W3: X = 0 (Y \leq b, Z \leq c)$<br>$W4: Z = c (X \leq a, Y \leq b)$<br>$W5: Y = b (X \leq a, Z \leq c)$<br>$W6: X = a (Y \leq b, Z \leq c)$ |

DEVICE TABLE

| PLAYBACK DEVICE | SUPPORTED FORMAT | DEVICE PARAMETER |
|---|---|---|
| $D_1$ (PROJECTOR) | H.264 | FRAME RATE $d_{11}$=30<br>SCREEN SIZE $d_{12}$=0.3×(DISTANCE A TO PROJECTION SURFACE)$^2$<br>THREE-DIMENSIONAL COORDINATES $d_{13}$=(f,g,h)<br>UNIT DIRECTIONAL VECTOR $d_{14}$=(i,j,k)<br>CENTRAL DIRECT NORMAL ILLUMINANCE $d_{15}$=1000/(DISTANCE A TO PROJECTION SURFACE)$^2$ |

MEDIA TABLE

| MEDIA | FORMAT | MAPPING EVALUATION SCALE |
|---|---|---|
| $M_1$ (IMAGE) | H.264 | · PROJECTION AREA $E_{11}$=1.8 (WEIGHT 1.0), FRAME RATE $E_{12}$=60 (WEIGHT 0.5), CENTRAL DIRECT NORMAL ILLUMINANCE $E_{13}$=50 (WEIGHT 0.3) · OVERALL WEIGHT=0.6 |

CONTENT PLAYBACK DEVICE, CONTENT PLAYBACK METHOD AND CONTENT PLAYBACK PROGRAM

CROSS-REFERENCE TO RELATED APPLICATIONS

This application is a 371 U.S. National Phase of International Application No. PCT/JP2019/027389 filed on Jul. 10, 2019. The entire disclosure of the above application is incorporated herein by reference.

TECHNICAL FIELD

The present invention relates to a device and a method for playing back a content made of one or more pieces of media data. The present invention particularly relates to a device and a method for playing back a content made of a plurality of kinds of media data.

BACKGROUND ART

Viewing of contents made of media data such as image data and sound data has become popular, and in addition, highly realistic contents have been becoming available. Such a highly realistic content is produced for a particular playback environment and usually cannot be played back in another playback environment in the same manner due to differences in an encoding scheme and a control method.

However, playback in a particular playback environment can be achieved as much as possible by appropriately mapping media data to a device in a playback environment based on a certain evaluation scale. Hereinafter, the evaluation scale used in this case is referred to as a "mapping evaluation scale". The mapping evaluation scale is configured as a parameter that affects a physical playback result of media data.

Non-Patent Literature 1 discloses a method of mapping a 3DCG image to a group of projectors as a content producer inputs the mapping evaluation scale. To perform playback so that a 3DCG content appropriately appears to a viewer in a given playback environment in which the group of projectors is installed, a system of Non-Patent Literature 1 acquires playback environment information such as a 3D map of a room and the positions and postures of the projectors and the viewer, and the content producer sets, as the mapping evaluation scale, the desired values of physical parameters indicating relations of relative three-dimensional coordinates, orientations, and volumes among 3DCG objects. Accordingly, the system of Non-Patent Literature 1 determines appropriate mapping and supplies image data to a projector.

The numbers of kinds and pieces media data included in a highly realistic content tend to increase in the future. The mapping evaluation scale needs to be manually set in conventional cases, and this work becomes complicated as the numbers of kinds and pieces of media data increase. Thus, work of setting the mapping evaluation scale of a content needs to be reduced.

CITATION LIST

Non-Patent Literature

Non-Patent Literature 1: Andreas Fender et al: "OptiSpace: Automated Placement of Interactive 3D Projection Mapping Content", CHI, 2018

SUMMARY OF THE INVENTION

Technical Problem

The present disclosure is intended to enable playback of media data corresponding to a sensibility effect set in advance.

Means for Solving the Problem

A content playback device of the present disclosure includes: a device table production unit configured to hold a device table in which a format of media data that can be played back and a device parameter used at playback of the media data are determined for each device; a media table production unit configured to acquire metadata including the format and a sensibility effect label of the media data, determine a mapping evaluation scale that is a device parameter corresponding to the sensibility effect label in accordance with a conversion table in which a value of a device parameter is determined for each combination of a sensibility effect label and a format, and produce a media table in which the mapping evaluation scale and the format are determined for each media data; and a mapping determination unit configured to extract, based on the formats included in the device table and the media table, a combination pattern of a device that is included in the device table and on which media data included in the media table can be played back and the media data included in the media table, select, from among extracted combination patterns, a combination pattern for which a relative error between a device parameter included in the device table and a mapping evaluation scale included in the media table is minimum, and select a device that is an output destination of the media data.

A content playback method of the present disclosure includes: a device table production unit holding a device table in which a format of media data that can be played back and a device parameter used at playback of media are determined for each device; a media table production unit acquiring metadata including the format and a sensibility effect label of the media data, determining a mapping evaluation scale that is a device parameter corresponding to the sensibility effect label in accordance with a conversion table in which a value of a device parameter is determined for each combination of a sensibility effect label and a format, and producing a media table in which the mapping evaluation scale and the format are determined for each media data; and a mapping determination unit extracting, based on the formats included in the device table and the media table, a combination pattern of a device that is included in the device table and on which media data included in the media table can be played back and the media data included in the media table, selecting, from among extracted combination patterns, a combination pattern for which a relative error between a device parameter included in the device table and a mapping evaluation scale included in the media table is minimum, and selecting a device that is an output destination of the media data.

A content playback program of the present disclosure is a computer program that causes a computer to function as each functional component provided to the content playback device according to the present disclosure, and is a computer program that causes a computer to execute each procedure provided to the content playback method according to the present disclosure.

Effects of the Invention

According to the present disclosure, it is possible to enable playback of media data corresponding to a sensibility effect set in advance.

BRIEF DESCRIPTION OF DRAWINGS

FIG. 3 illustrates exemplary device information.

FIG. 4 illustrates an exemplary device table.

FIG. 5 illustrates exemplary parameters transmitted to a mapping determination unit.

FIG. 6 illustrates exemplary network parameters transmitted to an output unit.

FIG. 7 is a block configuration diagram of a media table production unit.

FIG. 8 illustrates exemplary metadata.

FIG. 9 illustrates an exemplary conversion table of a sensibility effect and a mapping evaluation scale.

FIG. 10 illustrates an exemplary media table.

FIG. 11 is a flowchart illustrating exemplary operation of the mapping determination unit.

FIG. 14 illustrates a first exemplary format conversion table.

FIG. 15 illustrates a second exemplary format conversion table.

FIG. 16 illustrates exemplary device extraction according to the present embodiment.

FIG. 17 illustrates exemplary device information of a third embodiment.

FIG. 18 illustrates an exemplary media table of the third embodiment.

FIG. 19 illustrates exemplary metadata of a fourth embodiment.

FIG. 20 illustrates an exemplary conversion table of the sensibility effect and the mapping evaluation scale of the fourth embodiment.

FIG. 21 illustrates an exemplary media table of the fourth embodiment.

FIG. 22 illustrates an exemplary table that determines a method of calculating the mapping evaluation scale.

FIG. 23 illustrates exemplary device parameters included in the device table of the fourth embodiment.

DESCRIPTION OF EMBODIMENTS

Embodiments of the present disclosure will be described below in detail with reference to the accompanying drawings. Note that the present disclosure is not limited to the embodiments described below. These embodiments are merely exemplary, and the present disclosure may be achieved in a form provided with various kinds of change and modification based on knowledge of the skilled person in the art. Note that components having the same reference sign in the present specification and drawings are identical to each other.

First Embodiment

Figure 1:
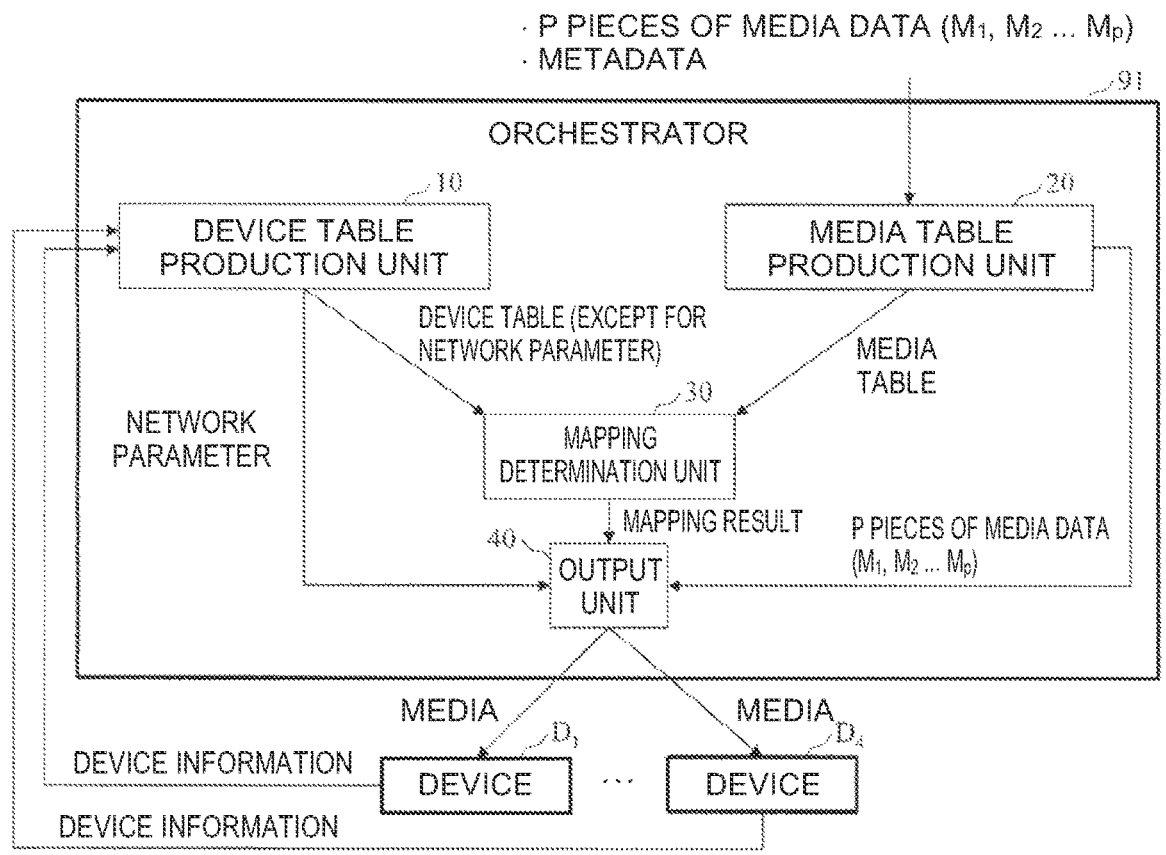
FIG. 1 illustrates an exemplary system configuration according to the present disclosure.

FIG. 1 illustrates an exemplary system configuration according to the present disclosure. A content playback system according to the present disclosure includes a plurality of devices $D_1$ to $D_4$, and an orchestrator 91 configured to sort and output input media data to any of the plurality of devices. The devices $D_1$ to $D_4$ are optional devices on which media data can be played back. The orchestrator 91 sorts and outputs a plurality of pieces of received media data (such as images, sound, sound effects, and illumination effects) to a plurality of devices (such as a display, a speaker, and an illumination). Here, media data is data into which information such as an image or sound is electrically encoded. A content is made of one or more groups of media data, and metadata related to the groups of media data.

The orchestrator 91 includes a device table production unit 10 configured to execute a device table production procedure, a media table production unit 20 configured to execute a media table production procedure, a mapping determination unit 30 configured to execute a mapping determination procedure, and an output unit 40 configured to execute an output procedure.

In the device table production procedure, the device table production unit 10 acquires device information from each of the devices $D_1$ to $D_4$ and produces a device table by using the device information. In the media table production procedure, the media table production unit 20 acquires media data and metadata of the media data and produces a media table. In the mapping determination procedure, the mapping determination unit 30 determines, by using the device table and the media table, a combination of media data and the devices $D_1$ to $D_4$ on which the media data is played back. In the output procedure, the output unit 40 sorts the media data to the devices $D_1$ to Da in accordance with a result of mapping by the mapping determination unit 30.

<Device Table Production Unit 10>

Figure 2:
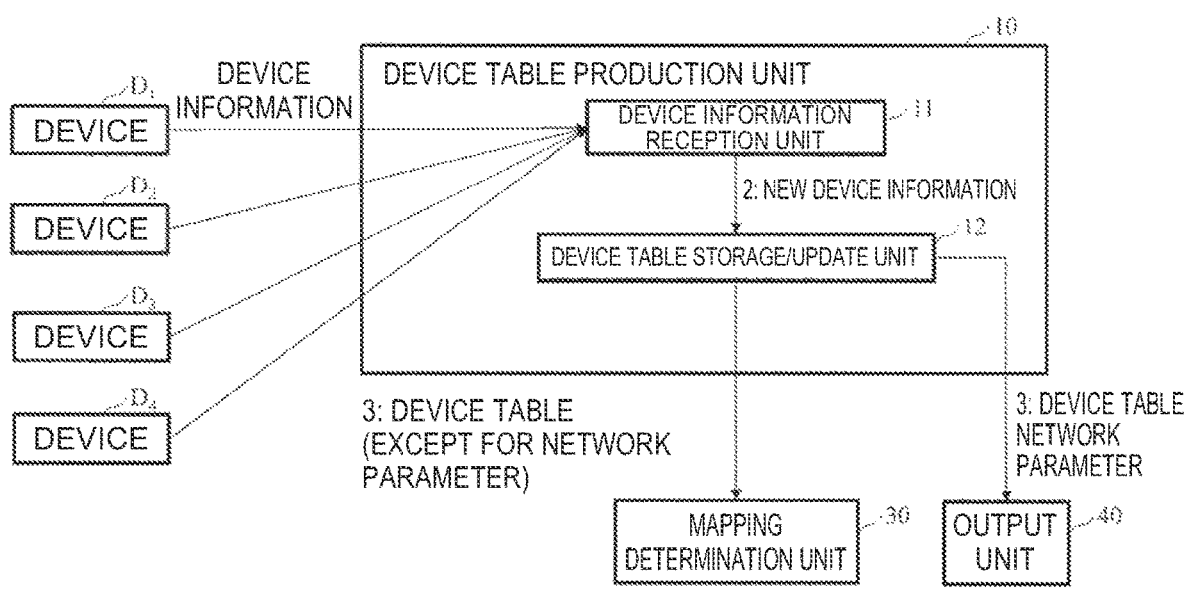
FIG. 2 is a block configuration diagram of a device table production unit.

FIG. 2 is a block configuration diagram of the device table production unit 10. The device table production unit 10 includes a device information reception unit 11 and a device table storage/update unit 12.

Procedure 1: the device information reception unit 11 acquires device information from each of the devices $D_1$ to $D_4$. The device information includes identification information, a supported format, device parameters, and network parameters of the device. The "supported format" is the format of media data that can be played back on the device. The "device parameter" is an optional parameter used by the device when media data is played back. The "network parameter" is information for transmitting and receiving media data and includes an IP address, a port number, and a supported protocol.

FIG. 3 illustrates exemplary device information when the device $D_1$ performs image display. The supported format is H.264. The device parameters include a frame rate and projection area. The frame rate is 30, and the projection area is 2.0. The network parameters include the IP address=192.168.2.10, the port number=8118, and the supported protocol of RTP.

A method by which the device information reception unit 11 acquires device information is optional. The timing of transmission is, for example, a timing at which the media table production unit 20 receives media data.

Procedure 2: the device information reception unit 11 passes new device information received from each of the devices $D_1$ to $D_4$ to the device table storage/update unit 12.

Procedure 3: having received the new device information, the device table storage/update unit 12 updates a held device table by adding the new device information to the device table and stores the updated device table. The format of description of the device table is, for example, JavaScript (registered trademark) Object Notation (JSON) format.

FIG. 4 illustrates an exemplary updated device table. In the updated device table, device information of the device $D_1$ that is an image display is added to device information of the devices $D_3$ and $D_4$ that are illumination instruments and device information of the device D that is an image display.

Procedure 4: the device table production unit 10 transmits any parameter necessary for mapping, except for the network parameters, from the device table held in the device table storage/update unit 12 to the mapping determination unit 30. In addition, the device table production unit 10 transmits the network parameters of each playback device from the device table held in the device table storage/update unit 12 to the output unit 40. FIG. 5 illustrates exemplary parameters transmitted to the mapping determination unit 30. FIG. 6 illustrates exemplary parameters transmitted to the output unit 40.

<Media Table Production Unit 20>

FIG. 7 is a block configuration diagram of the media table production unit 20. The media table production unit 20 includes a reception unit 21 and a conversion unit 22.

Procedure 1: the reception unit 21 receives media data and metadata from the outside of the orchestrator 91. Metadata is applied to media data by, for example, storing image data of the H.264 format and metadata thereof into an MP4 container.

FIG. 8 illustrates exemplary metadata. Metadata includes format information of media data and a sensibility effect label thereof. For example, media data $M_1$ is image data and associated with the format information=H.264 and the sensibility effect label=action effect. Media data $M_2$ is illumination data and associated with the format information=8 bit HSV and the sensibility effect label=action effect.

A "sensibility effect" is an effect of a physical result of playback of media data on sensibility such as mood and taste of a person having viewed the media data. For example, in playback of image data, the strength of a sensibility effect felt by a viewer as follows typically changes in accordance with physical values related to playback, such as the frame rate and image area in the visual field, in addition to the content of an image itself. Such a sensibility effect is "a situation or atmosphere that is vivid and in which motion can be clearly understood, in other words, an action effect". In addition, other various kinds of sensibility effects include a reality effect and a drama effect. The "reality effect" is, for example, a sensibility effect that what does not exist is felt as existing. The "drama effect" is a sensibility effect that emotional expressions such as delight, anger, sorrow, and pleasure are richly felt. The "sensibility effect label" is a simple string, sign, or identifier that indicates a sensibility effect. In the above-described example, the sensibility effect label corresponds to the strings of "action effect", "reality effect", and "drama effect".

Procedure 2: the reception unit 21 transmits the received media data to the output unit 40 and transmits the received metadata to the conversion unit 22 for conversion of a mapping evaluation scale.

Procedure 3: the conversion unit 22 converts, based on a "conversion table of the sensibility effect label and the mapping evaluation scale" that the conversion unit 22 has inside in advance, a sensibility effect label part of the received metadata into a weighted mapping evaluation scale in accordance with a format. The conversion unit 22 adds the converted metadata to the media table. The conversion unit 22 transmits the media table thus produced to the mapping determination unit 30.

FIG. 9 illustrates an exemplary conversion table of the sensibility effect label and the mapping evaluation scale. For example, in a case of media data of the H.264 format for which the sensibility effect label is the action effect, the evaluation scale of the projection area is 1.8 with a weight 1.0, the evaluation scale of the frame rate is 60 with a weight 0.5, and the overall weight is 0.7. In a case of media data of the H.264 format for which the sensibility effect label is the reality effect, the evaluation scale of the frame rate is 60 with a weight 1.0, the evaluation scale of the bit depth is 16 with a weight 0.5, and the overall weight is 0.6.

FIG. 10 illustrates an exemplary media table. For the media data $M_1$, as illustrated in FIG. 8, the format is H.264 and the sensibility effect label is the action effect. In this case, the mapping evaluation scale associated with the media data $M_1$ includes, according to the conversion table in FIG. 9, the projection area $E_{11}=1.8$ (weight $g_{11}=1.0$), the frame rate $E_{12}=60$ (weight $g_{12}=0.5$), and the overall weight $G_1=0.7$.

The following describes a "mapping evaluation scale $E_{prp}$". When p is an optional integer equal to or larger than one, $r_p$ mapping evaluation scales are set to media data $M_p$. When media data is to be played back at any one of a plurality of devices, an expected sensibility effect can be most obtained with a device for which the value of each mapping evaluation scale of the media data and the value of the corresponding device parameter are closer to each other. In addition, a value (for example, "projection area $E_{11}=1.8$" in FIG. 10) and a weight (for example, "weight $g_{11}=1.0$" in FIG. 10) indicating importance are set to each mapping evaluation scale. In this case, a device for which the value of "projection area" having a maximum weight is closest to the device parameter is allocated to playback of the media data. When the image media data $M_1$ shown in FIG. 10 is played back on any of the image displays $D_1$ and $D_2$ listed in the device table in FIG. 4, the action sensibility effect expected at playback of the media data $M_1$ can be most obtained by performing playback in the following manner. The following manner is that a device for which a device parameter $d_{12}$ or $d_{22}$ related to the projection area is nearest to the mapping evaluation scale $E_{11}$ related to the projection area is selected for playback.

The "overall weight (G)" included in the mapping evaluation scale will be described below. The overall weight is a numerical value that determines mapping priority of each of a plurality of pieces of media data. In the specific example illustrated in FIG. 10, the image media data $M_1$ has an overall weight $G_1$ of 0.7, and the illumination media data $M_2$ has an overall weight $G_2$ of 0.3. In this case, an objective function of the image media data $M_1$ having the larger overall weight is dominant in definitive mapping evaluation, and mapping that reduces the objective function of the image media data $M_1$ is more likely to be selected.

<Mapping Determination Unit 30>

FIG. 11 is a flowchart illustrating exemplary operation of the mapping determination unit 30. The mapping determination unit 30 executes steps S311 to S316.

Step S311: the mapping determination unit 30 receives the device table from the device table production unit 10 and the media table from the media table production unit 20. Then, the mapping determination unit 30 derives, from among the devices $D_1$ to $D_4$, a combination of devices on which the media data $M_1$ and $M_2$ is to be played back.

For example, when there are P pieces of media data ($M_1$ to M) and R devices ($D_1$ to $D_R$), the mapping determination unit 30 derives all combinations that map the media data and the devices. When all given media data can be played back on all given devices, an expression below holds: [Math. 1]

$$X = {}_RP_p R \times (R-1) \times (R-1) \times 2 \ldots (R-P+1) \quad \text{(Expression 1)}$$

where X represents the total number of combinations.

For example, in the present embodiment, there are the four kinds of devices $D_1$ to $D_4$ as illustrated in FIG. 4 and the two kinds of media data $M_1$ and $M_2$ as illustrated in FIG. 8. In this case, there are $X = {}_4P_2 = 4 \times 3 = 12$ combinations. However, not all devices can necessarily play back all media data, and in such a case, the total number X of combinations decreases. At this time, the mapping determination unit 30 compares each media data and the supported format of each device and derives a combination pattern only for a combination of the media data $M_p$ and the device $D_r$, the formats of which match each other.

Figure 12:
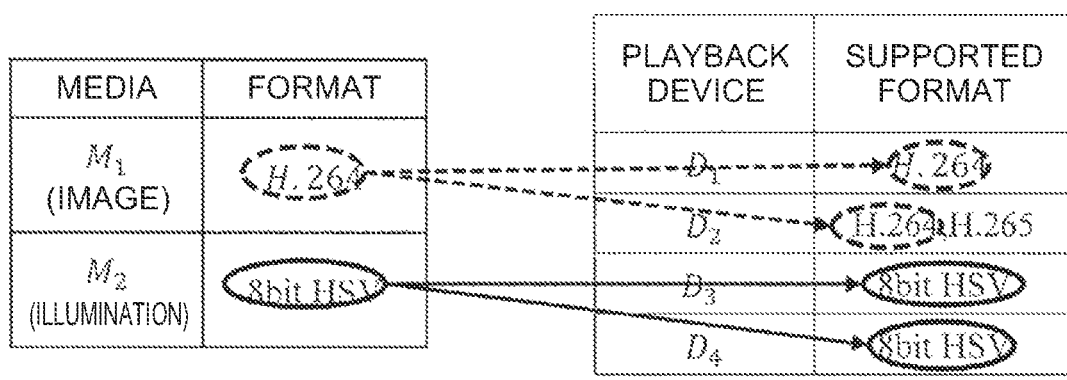
FIG. 12 illustrates exemplary mapping combinations of media data and a device.

FIG. 12 illustrates exemplary mapping combinations of media data and a device. In the present embodiment, the media data $M_1$ is image data of the H.264 format, and the media data $M_2$ is illumination data of 8 bit HSV. The devices $D_1$ and $D_2$ are image displays on which the H.264 format can be played back, and the devices $D_3$ and $D_4$ are illumination instruments on which 8 bit HSV can be played back. In this case, there are four combination patterns as follows.

Combination pattern x=1: combination of $M_1$ and $D_1$, combination of $M_2$ and D;
Combination pattern x=2: combination of $M_1$ and $D_2$, combination of $M_2$ and $D_3$
Combination pattern x=3: combination of $M_1$ and $D_1$, combination of $M_2$ and $D_4$
Combination pattern x=4: combination of $M_1$ and $D_2$, combination of $M_2$ and $D_4$ Step S312: the mapping determination unit 30 sets a combination pattern x (x=1 to X) and starts processing at x=1. In the present embodiment, there are the combination of p=1 and r=1, the combination of p=1 and r=2, the combination of p=2 and r=3, and the combination of p=2 and r=4.

Step S313: the mapping determination unit 30 calculates an objective function $L_p$ for each combination of the media data $M_p$ and the device $D_r$ by using Equation 2. [Math. 2]

$$L_p{}^r = \Sigma_{i=1}{}^{rp} e_{pi} g_{pi} \quad \text{(Expression 2)}$$

In the expression, $r_p$ represents the total number of mapping evaluation scales set to the media data $M_p$, p represents an identifier of media data and is a natural number p=1 to P, P represents the total number of pieces of media data to be played back, r represents an identifier of a device and is a natural number r=1 to R, R represents the total number of devices, and $e_{pi}$ represents a relative error between the i-th mapping evaluation scale $E_{pi}$ of the media data $M_p$ and an output value $E_{pi}'$ corresponding to the mapping evaluation scale $E_{pi}$ and is given by an expression below.

[Math. 3]

$$e_{pi} = \left| \frac{E_{pi} - E'_{pi}}{E_{pi}} \right| \quad \text{(Expression 3)}$$

The output value $E_{pi}'$ is the value of a device parameter corresponding to the mapping evaluation scale $E_{pi}$. For example, an output value $E_{11}'$ of the mapping evaluation scale $E_{11}$ is a device parameter corresponding to the projection area, and for the device $D_1$, the device parameter $d_{12}$ corresponds to the output value $E_{11}'$.

The objective function $L_p{}^r$ given by Equation 2 performs calculation that multiplies the relative error $e_{pi}$ by a weight $g_{pi}$ according to the mapping evaluation scale $E_{pi}$ and combines results of the multiplication. As the objective function $L_p{}^r$ is smaller, the relative error between each mapping evaluation scale and the corresponding output value is smaller. In other words, as the objective function $L_p{}^r$ is smaller, an expected sensibility effect can be more truly achieved. Thus, the mapping determination unit 30 calculates the objective function $L_p{}^r$ for all combinations of the media data $M_p$ (p=1 to P) and the device $D_r$ (r=1 to R). Then, at step S316, the mapping determination unit 30 determines, as association (mapping) of media data and a device for playback thereof, a combination pattern including a combination of the device $D_r$ and the media data $M_p$ for which the objective function $L_p{}^r$ is minimum.

Step S314: the mapping determination unit 30 calculates and records a mapping evaluation function $S_x$ for the combination pattern as described below by using the calculated objective function $L_p{}^r$[Math. 4]

$$S_x = \Sigma_{p=1}{}^P G_p L_p{}^r \quad \text{(Expression 4)}$$

It is thought that when the mapping evaluation function $S_x$ is minimum, an overall sensibility effect generated by a plurality of pieces of media data is achieved in a most expected state. Specifically, the mapping determination unit 30 searches for, according to the process in FIG. 11, the combination pattern x of mapping with which the mapping evaluation function $S_x$ is minimum.

Step S315: the mapping determination unit 30 updates x and returns to step S313. The mapping determination unit 30 proceeds to step S316 at x=X.

Step S316: the mapping determination unit 30 compares the mapping evaluation functions $S_x$ calculated for all combination patterns of x=1 to X and outputs the combination pattern x having minimum $S_x$ as a best mapping result.

The following describes a specific method of calculating the objective function $L_p{}^r$ and the mapping evaluation function $S_x$. In the present embodiment, for example, in a case of a media table illustrated in FIG. 10 and described below and the device table illustrated in FIG. 4, there are four combination patterns of mapping of two kinds of image playback devices x two kinds of illumination playback devices. Thus, in the present embodiment, X is 4, and the mapping determination unit 30 derives the mapping evaluation function $S_x$ for x=1 to 4.

x=1: combination of $M_1$ and $D_1$ and combination of M: and $D_3$
x=2: combination of $M_1$ and $D_2$ and combination of $M_2$ and $D_3$
x=3: combination of $M_1$ and $D_1$ and combination of $M_2$ and $D_4$
x=4: combination of $M_1$ and $D_2$ and combination of $M_2$ and $D_4$ Firstly, the following describes exemplary derivation of objective functions $L_1^1$ and $L_1^2$ of the media data $M_1$. In the case of p=1 and r=1, the output value $E_{11}'$ of the mapping evaluation scale $E_{11}$ (projection area) is equivalent to the device parameter $d_{12}$ (projection area) of the device $D_1$. In this case, a relative error $e_{11}$ of the output value $E_{11}'$ for the mapping evaluation scale $E_{11}$ can be calculated as:

[Math. 5]

$$e_{11} = \left|\frac{E_{11} - E_{11}'}{E_{11}}\right| = \left|\frac{E_{11} - d_{12}}{E_{11}}\right| \quad \text{(Expression 5)}$$

It is evaluated that a sensibility effect associated with media data is more truly achieved as $e_{11}$ is smaller. Similarly, a relative error $e_{12}$ of the frame rate can be calculated. When a relative error is calculated for each mapping evaluation scale in this manner, multiplied by the weight $g_{pi}$, and summed, $L_1^1$ is given by an expression as follows. [Math. 6]

$$L_1^1 = \Sigma_{i=1} e_{1i} g_{1i} \quad \text{(Expression 6)}$$

A mapping evaluation scale having a larger weight has larger influence on the objective function $L_p^r$. Thus, a device having an output value E' close to a mapping evaluation scale E having a large weight has small $L_p^r$ and is more likely to be mapped. With combinations of p=1 and r=1 and 2, $L_1^1$ and $L_1^2$ are calculated as follows.

[Math. 7]

$$L_1^1 = \sum_{i=1}^{2} e_{1i} g_{1i} = \quad \text{(Expression 7)}$$

$$e_{11}g_{11} + e_{12}g_{12} = \left|\frac{1.8 - 2.0}{1.8}\right| \times 1.0 + \left|\frac{60 - 30}{60}\right| \times 0.5 = 0.338$$

[Math. 8]

$$L_1^2 = \sum_{i=1}^{2} e_{1i} g_{1i} = \quad \text{(Expression 8)}$$

$$e_{11}g_{11} + e_{12}g_{12} = \left|\frac{1.8 - 1.0}{1.8}\right| \times 1.0 + \left|\frac{60 - 50}{60}\right| \times 0.5 = 0.438$$

In this manner, in the case of p=1, the projection area has a largest weight for the image media data $M_1$, in other words, is dominant, and thus $L_p^r$ is smaller for the device $D_1$ that is an image display capable of outputting a value close to the desired value of the projection area.

The same calculation for p=2 and r=3 and 4, in other words, objective functions $L_2^3$ and $L_2^4$ of the media data $M_2$ obtains:

[Math. 9]

$$L_2^3 = \sum_{i=1}^{2} e_{2i} g_{2i} = e_{21}g_{21} + e_{22}g_{22} = \quad \text{(Expression 9)}$$

$$\left|\frac{1800 - 1000}{1800}\right| \times 0.3 + \left|\frac{1.0 - 0.75}{1.0}\right| \times 1.0 = 0.519$$

[Math. 10]

$$L_2^4 = \sum_{i=1}^{2} e_{2i} g_{2i} = e_{21}g_{21} + e_{22}g_{22} = \quad \text{(Expression 10)}$$

$$\left|\frac{1800 - 1300}{1800}\right| \times 0.3 + \left|\frac{1.0 - 0.5}{1.0}\right| \times 1.0 = 0.427$$

Based on these expressions, mapping evaluation functions $S_1$ to $S_4$ of x=1 to 4 can be calculated as follows. [Math. 11]

$$S_1 = G_1 L_1^1 + G_2 L_2^3 = 0.7 \times 0.338 + 0.3 \times 0.519 = 0.2366 + 0.156 = 0.393 \quad \text{(Expression 11)}$$

[Math. 12]

$$S_2 = G_1 L_1^2 + G_2 L_2^3 = 0.7 \times 0.438 + 0.3 \times 0.519 = 0.3066 + 0.156 = 0.463 \quad \text{(Expression 12)}$$

[Math. 13]

$$S_3 = G_1 L_1^1 + G_2 L_2^4 = 0.7 \times 0.338 + 0.3 \times 0.427 = 0.2366 + 0.128 = 0.365 \quad \text{(Expression 13)}$$

[Math. 14]

$$S_4 = G_1 L_1^2 + G_2 L_2^4 = 0.7 \times 0.438 + 0.3 \times 0.427 = 0.3060 + 0.128 = 0.435 \quad \text{(Expression 14)}$$

In the present embodiment, an overall weight $G_1$ is used for derivation of $S_x$, and thus the objective function of the image media data $M_1$ has larger influence on the magnitude of $S_x$ (= is more dominant) and the objective function of $M_2$ (illumination) has smaller influence. In other words, calculation can be performed so that mapping evaluation is prioritized for media having a large overall weight $G_p$.

In the present embodiment, the mapping evaluation function $S_3$ for the combination pattern of x=3 is minimum. The mapping determination unit 30 employs, as a mapping combination pattern, the minimum $S_3$ from among the mapping evaluation functions $S_1$ to $S_4$. In this case, the mapping determination unit 30 outputs the combination pattern of x=3 as a mapping result.

Accordingly, in the present embodiment, the media $M_1$ is allocated to the device $D_1$, and the media data $M_2$ is allocated to the device $D_4$.

<Output Unit 40>

Figure 13:
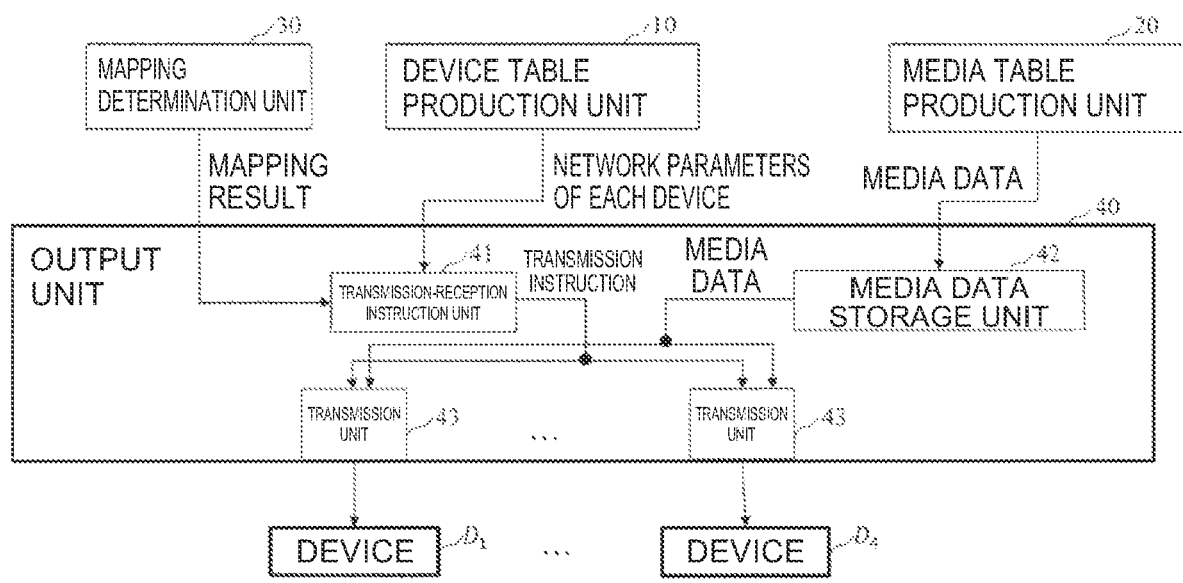
FIG. 13 is a block configuration diagram of the output unit.

FIG. 13 is a block configuration diagram of the output unit 40. The output unit 40 includes a transmission-reception instruction unit 41, a media data storage unit 42, and a transmission unit 43.

Procedure 1: the transmission-reception instruction unit 41 receives the network parameters of each device from the device table production unit 10.

Procedure 2: the output unit 40 receives media data from the media table production unit 20 and stores the media data in the media data storage unit 42.

Procedure 3: the transmission-reception instruction unit 41 receives a mapping result from the mapping determination unit 30. The mapping result includes the devices $D_1$ and $D_4$ on which the media data $M_1$ and $M_2$ are to be played back. Thereafter, the transmission-reception instruction unit 41 generates, by using the network parameters of each device, information necessary for transmission and reception of the media data. The information necessary for transmission and reception of the media data is, for example, a Session Description Protocol (SDP) file.

Procedure 4: the transmission-reception instruction unit 41 transmits the information necessary for transmission and reception of the media data and a transmission instruction for the media data to the transmission unit 43. The information necessary for transmission and reception of the media data is the network parameters of each device, which is acquired from the device table production unit 10. The media data storage unit 42 transmits the media data to the transmission unit 43.

The transmission unit 43 transmits the mapped media data to each of the devices $D_1$ to $D_4$. For example, the Real-time Transport Protocol (RTP) may be used as a method of transmitting the media data.

(Effects of Invention)

The present disclosure can achieve effects as follows. Work of setting a plurality of parameters included in a mapping evaluation scale can be simplified only to selection of a sensibility effect label.

An overall sensibility effect generated through playback of a plurality of pieces of media data can be automatically maximized.

Second Embodiment

In the present embodiment, the transmission-reception instruction unit 41 provided to the output unit 40 has a function to convert a format $F_p$ of the media data $M_p$.

In the first embodiment, at step S311 illustrated in FIG. 11, the mapping determination unit 30 extracts only a device, the supported format of which matches the format $F_p$ of the media data $M_p$, as a mapping combination target from among the devices $D_1$ to $D_4$. In the present embodiment, the format $F_p$ of the media data $M_p$ can be converted at the output unit 40. Thus, the mapping determination unit 30 of the present embodiment can increase the number of variations of combination patterns as long as format conversion is possible.

The mapping determination unit 30 refers to a format conversion table in which a format that can be converted at the transmission-reception instruction unit 41 is determined, and extracts a device that can be used through format conversion as a mapping combination target. Accordingly, in the present embodiment, a device is added as a mapping combination target when the format $F_p$ of the media data $M_p$ is different from the format of the device but the format $F_p$ of the media data $M_p$ can be converted to the supported format of the device.

FIG. 14 illustrates a first exemplary format conversion table. In the first exemplary format conversion table, formats between which bidirectional conversion is possible are arranged on each row. In this case, a table in which the conversion source and destination of a unidirectionally convertible format is described on each row is prepared in advance.

FIG. 15 illustrates a second exemplary format conversion table. In the second exemplary format conversion table, unidirectionally convertible formats are arranged.

In the present embodiment, since a format conversion table is prepared at the mapping determination unit 30, extraction of a playback device having a format corresponding to media data can be performed through a procedure described below.

FIG. 16 illustrates exemplary device extraction according to the present embodiment. For example, the media data $M_1$ is image media data of the H.265 format, and H.264 and H.265 are written as a bidirectionally convertible combination in the format conversion table.

In this case, when format conversion is not possible, the device $D_2$ is the only device that supports the format of the media data $M_1$. However, in the present embodiment, since format conversion is used, the devices $D_1$ and $D_2$ are extracted as devices that support the format of the media data $M_1$.

The mapping determination unit 30 transmits, as a mapping result, the devices $D_1$ and $D_2$ on which the media data $M_1$ and $M_2$ is to be played back as well as the formats of playback at the devices $D_1$ and $D_2$ to the transmission-reception instruction unit 41. The transmission-reception instruction unit 41 converts the format of the media data $M_1$ from H.265 to H.264 and transmits the media data $M_1$ after the conversion to the transmission unit 43 for the device $D_1$. Accordingly, playback of the media data $M_1$ at the device $D_1$ becomes possible.

Without format conversion, the total number X of combination patterns is 2×1=2. However, in the present embodiment, the total number X of combination patterns can be increased to 2×2=4 by using a table of bidirectional conversion of media formats.

According to the present embodiment, as the total number X of mapping combination patterns is increased, the minimum value of the mapping evaluation function $S_x$ can be decreased and a mapping combination having higher evaluation can be found.

Third Embodiment

In the first embodiment, the device parameter is fixed in calculation of the objective function $L_p^r$ at the mapping determination unit 30. Depending on the devices $D_1$ to $D_4$, the device parameter thereof can be varied in a predetermined range in some cases. The present embodiment is described for a case of a system in which the device $D_1$ has a device parameter that can be varied.

FIG. 17 illustrates exemplary device information of the present embodiment. The device information reception unit 11 of the present embodiment acquires, from each of the devices $D_1$ to $D_4$, a range in which the device parameter thereof varies. For example, in the case of the device $D_1$ that is an image display, the device information reception unit 11 acquires, as the device parameter, information that a brightness device parameter dl: can be varied or selected at the step width of 0.5 in the range of 1.0 to 3.0 and a numerical value such as 1.5 or 2.0 can be output.

When the combination pattern x is to be selected, the mapping determination unit 30 considers the range in which the device parameter varies. For example, as illustrated in FIG. 18, when information that brightness evaluation scale $E_{13}$ is 2.2 and a weight $g_{13}$ is 0.3 is written in a mapping evaluation scale column of the media data $M_1$ in the media table, the mapping determination unit 30 calculates a relative error $e_{13}$ by using the brightness evaluation scale $E_{13}$ at step S313.

Specifically, according to the device information illustrated in FIG. 17, an output value $E_{13}'$ of the brightness evaluation scale $E_{13}$ corresponds to the brightness device parameter $d_{13}$. The desired value of the brightness evaluation scale $E_{13}$ is 2.2. In this case, the mapping determination unit 30 selects a value to which variation is possible at the step width of 0.5 in the range of 1.0 to 3.0 and that is closest to 2.2, in other words, 2.0 as the output value of the brightness device parameter $d_{13}$. In this case, the relative error $e_{13}$ can be calculated as follows.

[Math. 15]

$$\left|\frac{E_{13} - E_{13}'}{E_{13}}\right| = \left|\frac{E_{13} - d_{13}}{E_{13}}\right| = \left|\frac{2.2 - 2.0}{2.2}\right| = 0.1 \qquad \text{(Expression 15)}$$

The mapping determination unit 30 transmits, as a mapping result, the devices $D_1$ and $D_2$ on which the media data $M_1$ and $M_2$ is to be played back as well as device parameters used at the devices $D_1$ and $D_2$ to the transmission-reception instruction unit 41. The transmission-reception instruction unit 41 transmits information that 2.0 is used as the brightness device parameter $d_{13}$ to the transmission unit 43 for the device $D_1$. Accordingly, the device $D_1$ plays back the media data $M_1$ by using 2.0 as the brightness device parameter $d_{13}$.

In the present embodiment, a value closer to the desired value of a mapping evaluation scale is used as a device parameter. Accordingly, the device $D_1$ can achieve a sensibility effect closer to a desired effect through playback of the media data $M_1$.

Fourth Embodiment

In the first embodiment, the media table production unit 20 allocates an absolute mapping evaluation scale that is not affected by the mapping evaluation scale of other media data. However, the media table production unit 20 of the present embodiment considers a relative mapping evaluation scale affected by other media data.

As illustrated in FIG. 19, metadata of media data acquired by the media table production unit 20 includes information related to a "relation with other media data" in addition to the items in FIG. 8. The information related to the "relation with other media data" includes, for example, information that the media data $M_1$ is a main and the media data $M_2$ is a sub when the media data $M_1$ and $M_2$ are both played back.

As illustrated in FIG. 20, a conversion table of a sensibility effect label and a mapping evaluation scale, which is referred to by the media table production unit 20 includes, in addition to the items in FIG. 9, information related to "media data relation" and a mapping evaluation scale indicating the relation between main media data and sub media data.

Information that the media data $M_1$ is a main and the media data $M_2$ is a sub is written in the metadata in FIG. 19. In this case, the media table production unit 20 reads information that the relative distance to the main media data is determined to be 2.0 in the mapping evaluation scale, and reflects the information to the mapping evaluation scale of the sub media data $M_2$. For example, the media table production unit 20 sets, to the mapping evaluation scale of the media data $M_2$, information that the main media data is $M_1$, the relative distance to the media data $M_1$ is 2.0, and a weight is 0.5. Accordingly, conversion is made into a media table as illustrated in FIG. 21. As described above, the media data $M_2$ can have a relative mapping evaluation scale for the media data $M_1$.

In the first embodiment, when the mapping determination unit 30 calculates the objective function $L_p^r$ the output value of a mapping evaluation scale is equivalent to a device parameter having a corresponding name. For example, the output value of the mapping evaluation scale "projection area" of image media data is equivalent to the device parameter "projection area" of an image display. In the present embodiment, a plurality of device parameters are needed to calculate the output value of a relative mapping evaluation scale. Thus, in the present embodiment, a table that determines a mapping evaluation scale calculation method as illustrated in FIG. 22, which indicates a device parameter and a calculation method is produced in advance.

In the present embodiment, device parameters included in the device table includes three-dimensional coordinates as illustrated in FIG. 23. The three-dimensional coordinates are information indicating a position at which a device is disposed. The present embodiment describes a simple example in which the three-dimensional coordinates of the device $D_1$ are (0, 1, 2) and the three-dimensional coordinates of the device $D_2$ are (0, 2, 1).

The mapping determination unit 30 calculates the mapping combination pattern x by using the media table, the device table, and a table that determines a method of calculating the output value of a mapping evaluation scale.

For example, when the mapping evaluation scale is the relative distance between main media data and sub media data, the output value of the mapping evaluation scale is calculated as follows. [Math. 16]

$$|\vec{v_a} - \vec{v_b}|$$ (Expression 16)

In the expression, $\vec{v_a}$ represents the 3D coordinate of the device that maps the main media data, and $\vec{v_b}$ represents the 3D coordinate of the device that maps the sub-media data.

The mapping determination unit 30 can read three-dimensional coordinates $d_{13}$ and $d_{23}$ from the device table and obtain an output value $E_{22}'$ and a relative error $e_{22}$ of a relative distance $E_{22}$ to the media data $M_1$.

[Math. 17]

$$E_{22}' = |\vec{d_{13}} - \vec{d_{23}}| = \sqrt{(0-0)^2 + (1-2)^2 + (2-1)^2} = \sqrt{2}$$ (Expression 17)

[Math. 18]

$$e_{22} = \left|\frac{E_{22} - E_{22}'}{E_{22}}\right| = \left|\frac{E_{22} - |\vec{d_{13}} - \vec{d_{23}}|}{E_{22}}\right| = \left|\frac{2.0 - \sqrt{2}}{2.0}\right|$$ (Expression 18)

According to the present embodiment, a combination pattern having a higher sensibility effect can be selected by using a mapping evaluation scale based on consideration of the media data relation. For example, in a case of the sensibility effect label of the action effect, mutual interaction occurs between main media data and sub media data by presenting the main media data and additionally presenting the sub media data at an appropriate relative distance, and the action effect increases.

Fifth Embodiment

Figures 24, 25:
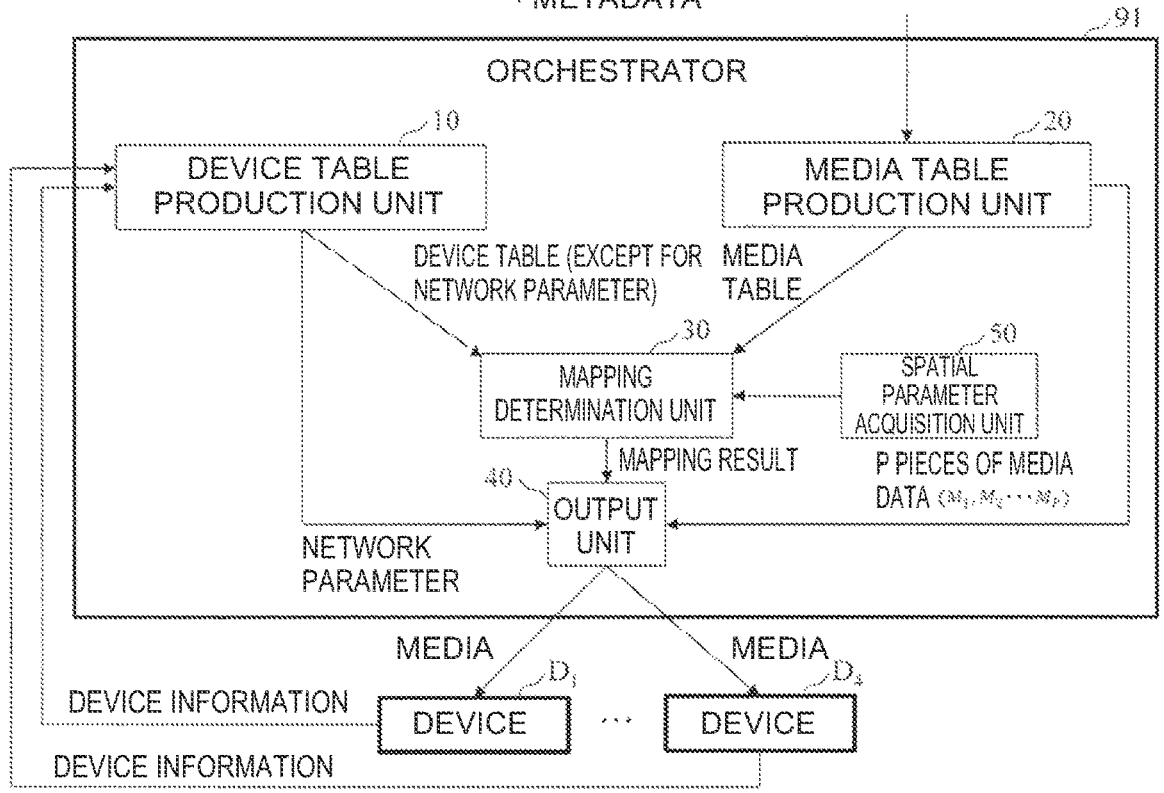
FIG. 24 illustrates an exemplary system configuration according to a fifth embodiment.
FIG. 25 illustrates an exemplary spatial parameter.

FIG. 24 illustrates an exemplary system configuration according to the present embodiment. The orchestrator 91 according to the present embodiment also includes a spatial parameter acquisition unit 50. In calculation of the objective function $L_p^r$ at the mapping determination unit 30, only the mapping evaluation scale $E_{pi}$ and the device parameter d are used above. In the present embodiment, spatial parameters are additionally used in the calculation.

The spatial parameter acquisition unit 50 is an optional means that acquires the spatial parameter, and is, for example, a sensor, a communication means that receives data from a sensor, or an input means such as a keyboard or a mouse.

The spatial parameter is a parameter that a space itself has and that affects a mapping evaluation scale. For example, the spatial parameters include the brightness of the space, a light reflection characteristic of a wall surface, an acoustic characteristic of the space, and a 3D map of the space.

FIG. 25 illustrates an exemplary spatial parameter. The spatial parameter illustrated in FIG. 25 is a 3D map of a space, and the ranges of wall surfaces in X-axis, Y-axis, and Z-axis directions are determined as illustrated in FIG. 26.

Figures 26, 27:
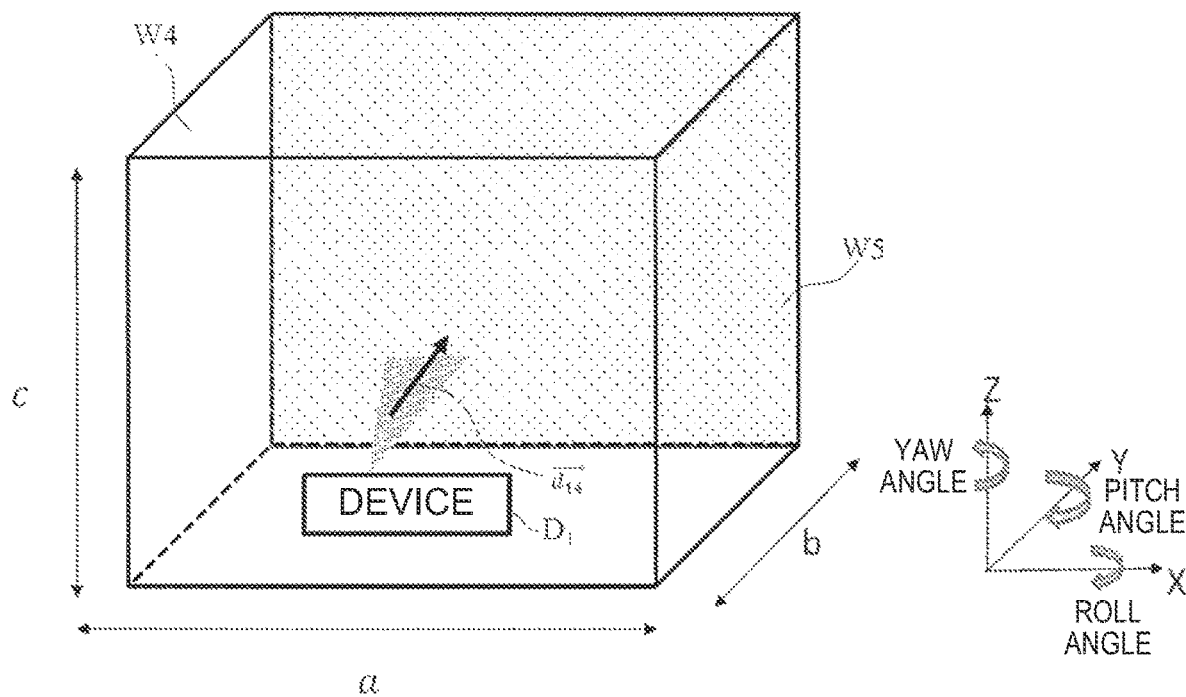
FIG. 26 is an explanatory diagram of the spatial parameter.
FIG. 27 illustrates exemplary device parameters included in a device table of the fifth embodiment.

FIG. 27 illustrates an exemplary device table of the present embodiment. In the device table of the present embodiment, the playback device $D_1$ is a projector, the supported format is H.264, and device parameters include a frame rate, a screen size, three-dimensional coordinates, a unit directional vector, and a central direct normal illuminance. The three-dimensional coordinates and the unit directional vector are elements of the spatial parameter.

In the present embodiment, the device parameter may not be fixed but may be written as a formula that uses the spatial parameter and other device parameters. For example, in this case, the screen size is not fixed but calculated based on the three-dimensional coordinates and the spatial parameter. With this configuration, a device parameter calculated by using the spatial parameter can be employed.

Figures 28, 29:
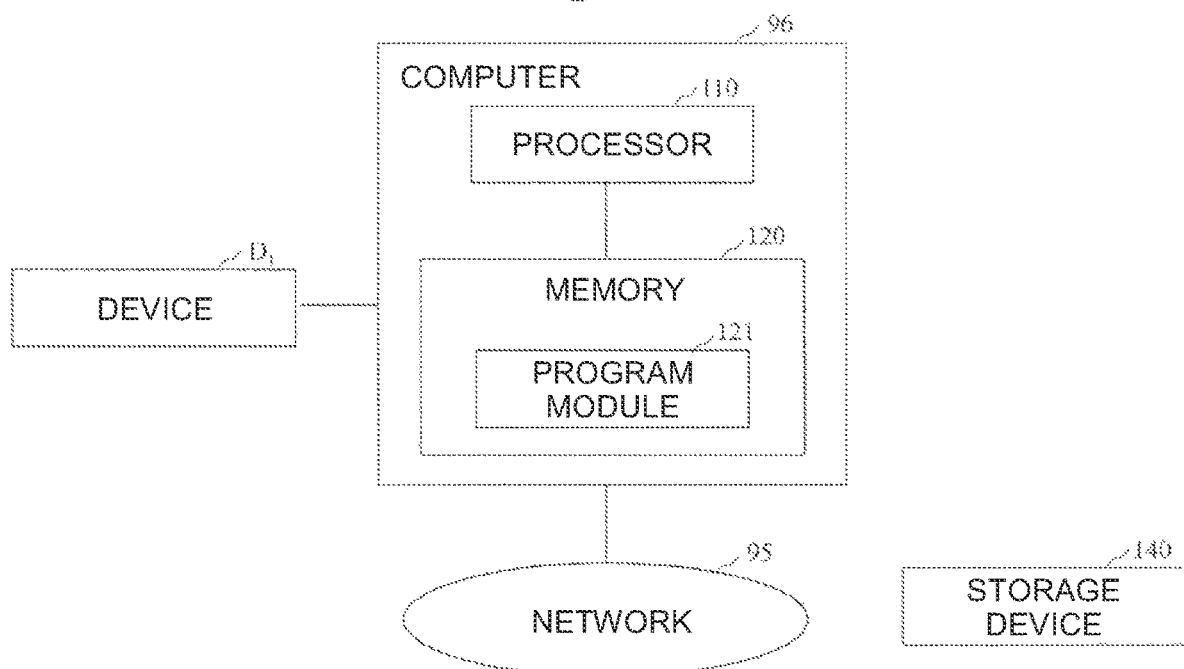
FIG. 28 illustrates an exemplary media table of the fifth embodiment.
FIG. 29 illustrates an exemplary hardware configuration of a system of the present disclosure.

FIG. 28 illustrates an exemplary media table of the present embodiment. In the media table of the present embodiment, the media data $M_1$ is image media data, the format thereof is H.264, and the mapping evaluation scale thereof includes the projection area, the frame rate, and the central direct normal illuminance.

The mapping determination unit 30 has the following consideration when extracting the combination pattern x. When any element of the spatial parameter exists in the device parameters, the mapping determination unit 30 reads the element of the spatial parameter. For example, in the case of the device $D_1$, the mapping determination unit 30 reads the three-dimensional coordinates $d_{13}=(f, g, h)$ and a unit directional vector $d_{14}=(i, j, k)$. Then, the mapping determination unit 30 refers to the spatial parameter and performs geometrical calculation using an equation of each wall surface. Accordingly, the mapping determination unit 30 determines a situation in which the device $D_1$ is to project an image onto a wall surface W5 in FIG. 26.

In this case, the relation in the Y coordinate between the device $D_1$ and the wall surface W5 at Y=b is $b=A \times j+g$ based on the spatial parameter. Accordingly, $A=(b-g)/j$ is calculated. Accordingly, the output value $E_{11}' (=d_{12})$ of the screen size and the output value $E_{13}' (=d_{15})$ of the central direct normal illuminance can be calculated.

The present embodiment has an effect of increasing a sensibility effect. For example, the central direct normal illuminance, which can be calculated only with consideration on the spatial parameter, is a parameter related to the brightness of media data such as an image or illumination and contributes to the sensibility effect label of the drama effect. With this consideration, mapping that further enhances the drama effect can be achieved.

Sixth Embodiment

FIG. 29 illustrates an exemplary hardware configuration of a system of the present disclosure. The system of the present disclosure includes a computer 96 configured to function as the content playback device according to the present disclosure and the device $D_1$. The computer 96 may be connected with a network 95. The network 95 is a data communication network.
Communication is performed by electronic signals and optical signals through the network 95.

The computer 96 includes a processor 110 and a memory 120 connected with the processor 110. The processor 110 is an electronic device configured as a logic circuit configured to respond to a command and execute the command. The memory 120 is a physical storage medium in which a computer program is encoded and that can be read by the computer 96. As for this point, the memory 120 stores data and commands that can be read and executed by the processor 110 for controlling operation of the processor 110, in other words, program codes. A computer program module 121 is a component of the memory 120.

The computer program module 121 includes a module for implementing an optional functional component provided to the present embodiment. For example, the computer program module 121 includes modules for achieving the device table production unit 10, the media table production unit 20, the mapping determination unit 30, and the output unit 40.

The computer program module 121 includes a command for controlling the processor 110 to execute a process described in the present specification. The computer program module 121 is illustrated as being already loaded onto the memory 120 but may be configured to be placed on a storage device 140 and loaded onto the memory 120 later. The storage device 140 is a physical computer-readable storage medium configured to store the computer program module 121. Alternatively, the storage device 140 may be an electronic storage device of another kind, which is connected with the computer 96 through the network 95.

INDUSTRIAL APPLICABILITY

The present disclosure is applicable to information communication industries.

REFERENCE SIGNS LIST 10 device table production unit
11 device information reception unit
12 device table storage/update unit
20 media table production unit
21 reception unit
22 conversion unit
30 mapping determination unit
40 output unit
41 transmission-reception instruction unit
42 media data storage unit
43 transmission unit
91 orchestrator
95 network
96 computer
110 processor
120 memory
121 computer program module
140 storage device

The invention claimed is:
1. A content playback device comprising:
a processor; and
a storage medium having computer program instructions stored thereon, when executed by the processor, perform to:
hold a device table in which a format of media data that can be played back and a device parameter used at playback of the media data are determined for each device;
acquire metadata including the format and a sensibility effect label of the media data, determine a mapping evaluation scale that is a device parameter corresponding to the sensibility effect label in accordance with a conversion table in which a value of a device parameter is determined for each combination of a sensibility effect label and a format, and produce a media table in which the mapping evaluation scale and the format are determined for each media data; and extract, based on the formats included in the device table and the media table, a combination pattern of a device that is included in the device table and on which media data included in the media table can be played back and the media data included in the media table, select, from among extracted combination patterns, a combination pattern for which a relative error between a device parameter included in the device table and a mapping evaluation scale included in the media table is minimum, and select a device that is an output destination of the media data.

2. The content playback device according to claim 1, wherein the mapping evaluation scale includes an overall weight that determines priority of the media data, and wherein the computer program instructions further perform to calculates a relative error with regard to each mapping evaluation scale by using a device parameter included in the device table, and calculates a relative error between a device parameter included in the device table and a mapping evaluation scale included in the media table by calculating the sum of a relative error obtained by multiplying the relative error of each mapping evaluation scale by the overall weight.

3. The content playback device according to claim 1, wherein the computer program instructions further perform to output the media data corresponding to the combination pattern of the device and the media data, convert the format of media data, and includes, as a format in the device table, a format that can be converted and extracts the combination pattern.

4. The content playback device according to claim 1, wherein a device parameter included in the device table includes a range in which the device parameter can be varied at the device, and wherein the computer program instructions further perform to calculates the relative error between a device parameter included in the device table and a mapping evaluation scale included in the media table by using, in the range in which the device parameter included in the device table can be varied, a device parameter nearest to the mapping evaluation scale included in the media table.

5. The content playback device according to claim 1, wherein the metadata includes a relative relation with other media data, the conversion table in which a value of a device parameter is determined for each combination of a sensibility effect label and a format includes a mapping evaluation scale indicating a relative relation with media data having the relative relation, and wherein the computer program instructions further perform to calculates a relative error between a device parameter included in the device table and a mapping evaluation scale included in the media table by using the mapping evaluation scale indicating the relative relation with media data having the relative relation.

6. A content playback method comprising:

holding a device table in which a format of media data that can be played back and a device parameter used at playback of media are determined for each device;

acquiring metadata including the format and a sensibility effect label of the media data, determining a mapping evaluation scale that is a device parameter corresponding to the sensibility effect label in accordance with a conversion table in which a value of a device parameter is determined for each combination of a sensibility effect label and a format, and producing a media table in which the mapping evaluation scale and the format are determined for each media data; and extracting, based on the formats included in the device table and the media table, a combination pattern of a device that is included in the device table and on which media data included in the media table can be played back and the media data included in the media table, selecting, from among extracted combination patterns, a combination pattern for which a relative error between a device parameter included in the device table and a mapping evaluation scale included in the media table is minimum, and selecting a device that is an output destination of the media data.

7. The method of claim 6 wherein the mapping evaluation scale includes an overall weight that determines priority of the media data, and further comprises calculating a relative error with regard to each mapping evaluation scale by using a device parameter included in the device table, and calculating a relative error between a device parameter included in the device table and a mapping evaluation scale included in the media table by calculating the sum of a relative error obtained by multiplying the relative error of each mapping evaluation scale by the overall weight.

8. The method of claim 6 further comprises outputting, to the device selected by the mapping determination unit, the media data corresponding to the combination pattern of the device and the media data.

9. The method of claim 6 wherein a device parameter included in the device table includes a range in which the device parameter can be varied at the device, and further comprises calculating the relative error between a device parameter included in the device table and a mapping evaluation scale included in the media table by using, in the range in which the device parameter included in the device table can be varied, a device parameter nearest to the mapping evaluation scale included in the media table.

10. The method of claim 6 the metadata includes a relative relation with other media data, the conversion table in which a value of a device parameter is determined for each combination of a sensibility effect label and a format includes a mapping evaluation scale indicating a relative relation with media data having the relative relation, and further comprises calculating a relative error between a device parameter included in the device table and a mapping evaluation scale included in the media table by using the mapping evaluation scale indicating the relative relation with media data having the relative relation.

* * * * *